United States Patent [19]

Finzel

[11] Patent Number: 4,836,638
[45] Date of Patent: Jun. 6, 1989

[54] CONNECTOR ELEMENT FOR LIGHT WAVEGUIDES

[75] Inventor: Lothar Finzel, Munich, Fed. Rep. of Germany

[73] Assignee: Siemens Aktiengesellschaft, Berlin and Munich, Fed. Rep. of Germany

[21] Appl. No.: 107,341

[22] Filed: Oct. 13, 1987

[30] Foreign Application Priority Data

Oct. 16, 1986 [DE] Fed. Rep. of Germany ....... 3635274

[51] Int. Cl.[4] ................................................ G02B 6/38
[52] U.S. Cl. .............................. 350/96.21; 350/96.20
[58] Field of Search ................ 350/96.20, 96.21, 96.22

[56] References Cited

U.S. PATENT DOCUMENTS

| 4,214,809 | 7/1980 | Reh | 350/96.20 |
| 4,562,632 | 1/1986 | Parchet et al. | 29/281.1 |
| 4,657,341 | 4/1987 | Sammueller | 350/96.22 |
| 4,725,114 | 2/1988 | Murphy | 350/96.21 X |
| 4,762,390 | 8/1988 | Finzel | 350/96.21 |

FOREIGN PATENT DOCUMENTS

| 0189946 | 8/1986 | European Pat. Off. |
| 3408783 | 2/1985 | Fed. Rep. of Germany . |
| 57-44113 | 3/1982 | Japan ............................ 350/96.20 |
| 2041566 | 9/1980 | United Kingdom . |

OTHER PUBLICATIONS

*Patent Abstracts of Japan,* vol. 3, No. 110 (E-137), Sep. 14, 1979, Application No. 54-87 239 (7/11/1979).

*Primary Examiner*—John D. Lee
*Attorney, Agent, or Firm*—Hill, Van Santen, Steadman & Simpson

[57] ABSTRACT

A connector element, which is composed of two carrier members with cover plates that are held in alignment by guide rails received in guide channels of the member, is provided with an arrangement of collecting surfaces for collecting excess adhesive materials and immersion fluids to keep these fluids and materials from the guide channels of the carrier members. The collecting surfaces can be formed by parting webs, by grooves in the carrier members, or beveled edge surfaces of the cover plates of each carrier member.

9 Claims, 3 Drawing Sheets

CONNECTOR ELEMENT FOR LIGHT WAVEGUIDES

BACKGROUND OF THE INVENTION

The present invention is directed to a connector element for a plurality of light waveguides. The connector element includes two carrier members arranged in alignment. Each member has a plurality of V-shaped centering grooves extending parallel to each other for the acceptance of light waveguides and guide channels on both sides of the centering grooves in which appropriately adapted guide rails are received to extend between the two carrier members. Each of the carrier members has a cover plate for covering the light waveguides in the V-shaped grooves with an immersion fluid being introduced and an adhesive material being provided for securing the optical fibers, cover plate and carrier members together.

U.S. Pat. No. 4,657,341, whose disclosure is incorporated by reference and which claims priority from two German applications, including German Application No. 34 08 783, discloses a connector element of the above-described type. In the connector element of the patent, stripped optical fibers are pressed into V-shaped centering grooves of a respective carrier member and are constrained in these grooves. After the insertion of the light waveguides, the cover plate is glued to the carrier member by an adhesive material which is introduced in the region of the light waveguides, for example, from the end face. As a consequence of the capillary action of the centering grooves and due to the narrow gap between the cover plate and carrier member, the adhesive material penetrates into the existing cavities and, thus, joins the carrier member, cover plate and optical fibers to one another. The capillary action, however, can only be utilized when the adhesive material has a low viscosity. As shown in FIG. 1 of the present application, the adhesive material KM is distributed over the surface of the carrier member TK1, which is covered by the cover plate AP1 so that when applied the adhesive material KM penetrates into the guide channels FN1 and FN2, which lie on both sides of the centering grooves ZR1–ZRn. When this adhesive KM hardens, it will impede the insertion of guide rails, such as FS1 and FS2, as shown in FIG. 2.

In addition, the liquid immersion material can also cause problems. For example, the immersion material is applied to the end face of the carrier member TK1 before joining with the second carrier member. The immersion material or fluid is, thus, distributed at the end face of the carrier member TK1 and can flow into the guide channels FN1 or, respectively, FN2 and, subsequently, press or force the guide rails FS1 or FS2 out of their defined and specific seating. The two carrier members to be joined and equipped with optical fibers LWF1–LWFn will then no longer lie in exact alignment with one another and, thus, a higher attenuation will exist.

SUMMARY OF THE INVENTION

The object of he present invention is to provide a connector element which has simple means for suppressing the penetration of the adhesive material and/or immersion material into the guide channels.

This object is achieved in an improvement in a connector element for a plurality of light waveguides comprising two carrier members arranged in alignment, each carrier member having a plurality of parallel extending V-shaped centering grooves and a guide channel extending parallel on each side of the centering grooves for receiving guide rails which extend between two abutting carrier members, a cover plate lying on the waveguides, an adhesive material being provided for mutual securing of the optical fibers, cover plate and carrier member, and an immersion fluid being introduced adjacent the abutting surface of each member. The improvement is means including a collecting surface for preventing excess adhesive material and immersion fluid from flowing into the guide channels. The collecting surfaces are provided on each of the carrier members and/or on lateral faces of the cover plates.

By providing collecting surfaces for adhesive material or the immersion material, the adhesive material spreading from the centering groove region due to capillary action or the flowing of the immersion fluid is intercepted so that these materials can no longer penetrate into the guide channels. The guide channels, thus, remain free of the adhesive material and/or the immersion fluid so that the engaging guide rails always encounter a clean, specific seating surface, and this engagement is indispensible for a high precision alignment of the two carrier members.

Other advantages and features of the present invention will be readily apparent from the following description of the preferred embodiments, the drawings and claims.

DESCRIPTION OF THE PREFERRED EMBODIMENTS

Figure 1:
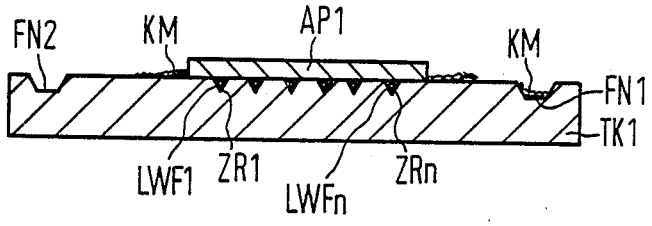
FIG. 1 is a transverse cross sectional view of a connector element in accordance with the prior art exhibiting the problems existing therewith.
Figure 2:
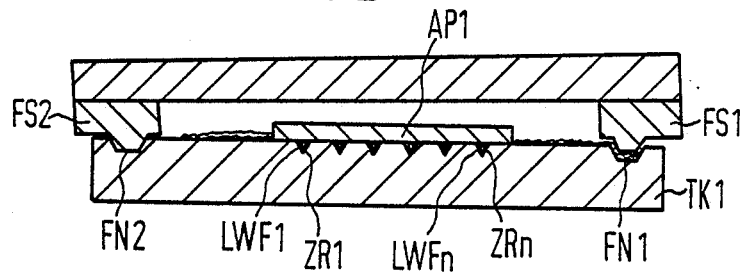
FIG. 2 is a transverse cross section similar to FIG. 1 of the prior art connector element having the guide rails assembled therewith.
Figure 3:
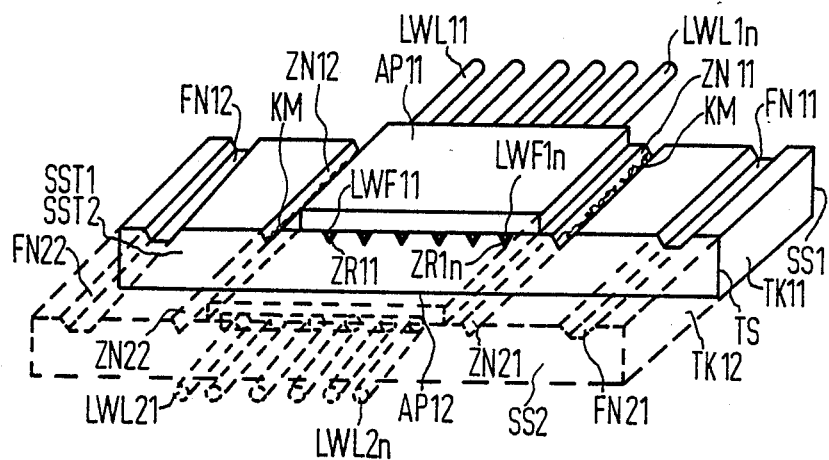
FIG. 3 is a perspective view of a first embodiment of a connector element in accordance with the present invention.

The principles of the present invention are particularly useful when incorporated into a connector element for light waveguides illustrated in FIG. 3. The connector element includes a carrier member TK11 having a cover plate AP11 and also a second, identical carrier member TK12, which is illustrated in broken lines. The second member TK12 has its end face SST2 aligned and pressed against an end face SST1 of the first carrier member TK11 to form an abutting location or plane TS. Each of the carrier members has centering grooves ZR11–ZR1n, which have a V shape and receive stripped optical fibers LWF11–LWF1n of the optical waveguides LWL11–LWL1n. The grooves ZR11–ZR1n are etched in the central region of each of the carrier members, which are advantageously composed of an etchable material. The carrier member TK12 is constructed in a similar manner. The carrier member TK11 has guide channels FN11 and FN12 which are situated along the lateral edges of the member TK11, while the member TK12 has similar guide channels FN21 and FN22. These guide channels serve for the alignment of the two carrier members TK11 and TK12 in that the guide channels receive guide rails such as FS1 and FS2 of FIG. 2, which have an appropriate profile or cross section so that when the rails are inserted into the channels FN11, FN12, FN21 and FN22, they will hold the two members in alignment with the waveguides LWL21-LWL2n aligned with the waveguides LWL11-LWL1n.

In order to prevent the adhesive material KM or the immersion material from flowing from the region of the centering grooves ZR11-ZR1n and the cover plate, such as AP11, means for preventing the excess flow are provided. As illustrated in FIG. 3, the means for preventing excess flow comprise continuous auxiliary grooves ZN11, ZN12, ZN21 and ZN22 which are etched in a region of each of the carrier members TK11 and TK12 that lie between the centering grooves and the guide channels, such as FN11 and FN12. As illustrated, these auxiliary channels serve the purpose of receiving the excess adhesive material KM. The auxiliary grooves ZN11, ZN12, ZN21 and ZN22 extend on both sides, and roughly parallel to the centering grooves ZR11-ZR1n and, advantageously, have a V-shaped or trapezoidal cross section. These auxiliary grooves lie close to the centering grooves and extend over both carrier members. When the auxiliary grooves ZN11, ZN12, ZN21 and ZN22 are subsequently ground into the carrier members TK11 and TK12, they can also assume any other shape. The base of each of the grooves should be at least as deep as the base of the grooves etched into the carrier members TK11 and TK12.

Figure 4:
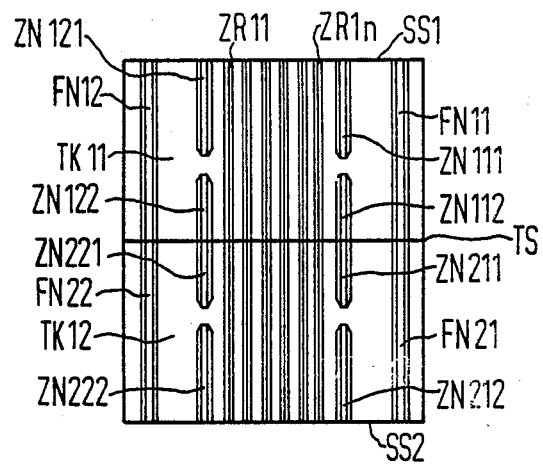
FIG. 4 is a plane view of two abutting carrier members without cover plates illustrating a modification of the arrangement of FIG. 3.

However, it is also possible that these auxiliary grooves ZN11, ZN12, ZN21 and ZN22 are not fashioned in a continuous fashion over the entire surface of both carrier members TK11 and TK12, but are composed of sub-grooves, as illustrated in FIG. 4. These sub-grooves ZN111, ZN112, ZN121, ZN122, ZN211, ZN212, ZN221, ZN222 are advantageously provided so each of the sub-grooves extends to at least a parting or end surface, such as SS1 or SS2. As illustrated, the sub-grooves ZN112 and ZN211 and grooves ZN122 and ZN221 extend to the end surface forming the parting surface TS and are matched to one another when the two carrier members TK11 and TK12 are aligned in an abutting relationship.

In the arrangement of FIG. 3, the centering grooves ZR11-ZR1n receive the optical fibers LWF11-LWF1n and are covered with the cover plate AP11 to the carrier member TK11. The adhesive material KM is thereby, for example, introduced into the centering grooves ZR11-ZR1n and proceeds from the end face, such as SS1 and SST1, and penetrates into the cavities between the cover plate AP11, the optical fibers LWL11-LWL1n and the centering grooves ZR11-ZR1n, due to capillary action. The carrier member TK12 is constructed in a similar manner. Since the capillary effect can only be exploited given employment of extremely thin-bodied adhesive materials KM, excessive adhesive material KM is also distributed on the surface of the carrier members TK11 or, respectively, TK12 when applied. The auxiliary grooves, such as ZN11, ZN12 and ZN21, ZN22, which proceed on both sides of the centering grooves, such as ZR11-ZR1n accept the spreading adhesive material KM by forming collecting surfaces so that a continued flow into the guide channel, such as FN11 and FN12, is reliably suppressed. The guide channels FN11 and FN12, as well as the guide channels FN21 and FN22 are kept free of the adhesive material KM and, in this manner, guarantee a clean, specific seating surface for engaging guide elements so that an exact alignment of the two carrier members TK11 and TK12 is achieved. The same is true in view of the collection of the excess immersion fluids.

Figure 5:
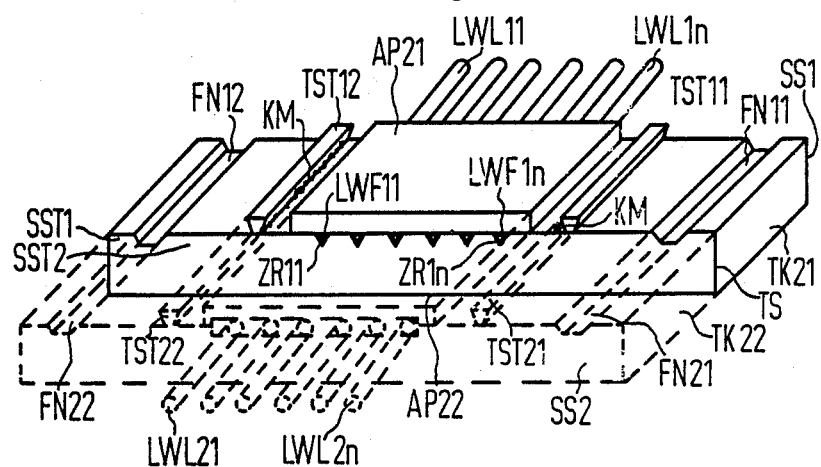
FIG. 5 is a perspective view of a second embodiment of the connector element in accordance with the present invention.

In the second embodiment illustrated in FIG. 5, two carrier members TK21 and TK22 (in broken lines) correspond to the carrier members TK11 and TK12 of the embodiment of FIG. 3 and have identical parts provided with the same reference elements. The primary difference of the embodiment of FIG. 5 over that of FIG. 3 is that the means for preventing the spread of the adhesive and immersion fluid comprise parting webs TST11, TST12 for the carrier member TK21 and parting webs TST21 and TST22 for the carrier member TK22, instead of the auxiliary grooves such as ZN11 and ZN12. These parting webs prevent the undesirable spread of the adhesive material KM into the guide channels FN11 and FN12, FN21 and FN22 of the two carrier members TK21 and TK22. These parting webs TST11 and TST12, TST21 and TST22 proceed on both sides of and close to the centering grooves, for example, the centering grooves ZR11-ZR1n, and form collecting surfaces for the spreading very liquid adhesive material KM so that a penetration of the adhesive material or, respectively, the immersion fluid, into the guide channels, such as FN11 and FN12, is reliably avoided. It is expedient when the angle between the lateral faces of the parting webs TST11 and TST12 or, respectively, TST21 and TST22, and the carrier surfaces, such as TK21 and TK22, respectively, is at least at the side facing the cover plate AP21 or AP22 selected to be an acute angle. For example, an angle in a range of 30°–45° and, preferably approximately 35°.

Figure 6:
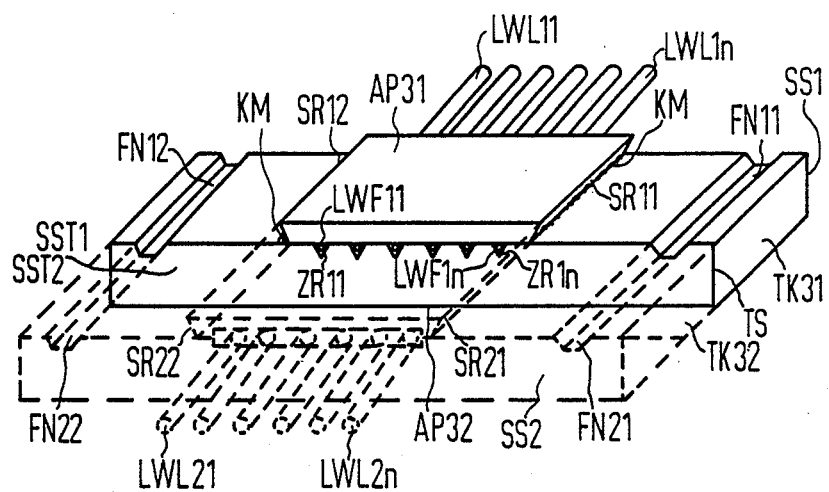
FIG. 6 is a perspective view of a third embodiment of the connector element of the present invention.

A third embodiment of the connector is illustrated in FIG. 6 and has the carrier members TK31 and TK32. In this embodiment, the means for preventing the flow of the adhesive material and/or the immersion material are that the longitudinal surfaces SR11 and SR12 of the cover AP31 and the surface SR21 and SR22 of the cover AP32 are beveled and form the collecting surfaces. The cover AP31 and AP32 have a trapezoidal cross section with the smaller, planar surface lying against the centering grooves, such as ZR11-ZR1n so that the beveled surfaces SR11 and SR12 precede outwardly with a wedge shape.

Figure 7:
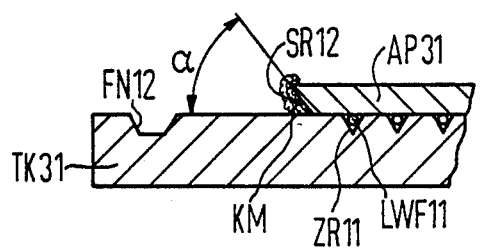
FIG. 7 is a partial transverse cross sectional view of the connector element of FIG. 6.

As best illustrated in FIG. 7, the beveled surfaces form an angle $\alpha$ so that the excess adhesive material, such s KM, will rise on this lateral surface, such as SR12, as a result of surface tension, and is distributed longitudinally thereon. This simple structural measure guarantees that the excess adhesive material KM does not spread on the surface of the carrier member TK31 or TK32 into the guide channels, for example FN12, so that the guide channels remain free of the adhesive material, such as KM, or the immersion material. It is expedient that the angle $\alpha$ is selected to be an acute angle, particularly in a range of between 30° and 45° and, preferably, at an angle of approximately 35°.

Each of the different embodiments of the means for preventing distribution illustrated in FIGS. 3, 5 and 7, which form collecting surfaces for distributing material, can also be utilized together. Thus, the chance of material creeping in a particular pronounced degree toward the guide channels FN11–FN22 can be reliably prevented.

Although various minor modifications may be suggested by those versed in the art, it should be understood that I wish to embody within the scope of the patent granted hereon all such modifications as reasonably and properly come within the scope of my contribution to the art.

I claim:

1. In a connector element for optical fibers, said connector element comprising two carrier members being arranged in alignment with their end faces abutting, each of the carrier members having a plurality of V-shaped centering grooves proceeding parallel to each other and containing said optical fibers, guide channels proceeding on both sides of the centering grooves for receiving guide rails which extend between the two carrier members, a cover plate lying on the optical fibers of the grooves of each member, an adhesive material for mutually fastening the optical fibers, cover plate and respective carrier member together, and an immersion fluid being introduced adjacent the abutting end faces of the members, the improvements comprising means for preventing a flow of both excess adhesive material and immersion fluid into the guide channels, said means for preventing including auxiliary grooves in each of the carrier members extending between the centering grooves and each guide channel, said auxiliary grooves providing collecting surfaces adjacent each side of the centering grooves.

2. In a connector element according to claim 1, wherein the auxiliary grooves are continuous along the entire length of each of the carrier members.

3. In a connector element according to claim 1, wherein the auxiliary grooves are composed of sub-grooves.

4. In a connector element according to claim 1, wherein the auxiliary grooves are aligned sub-grooves formed in each of the carrier members adjacent each side of the centering grooves.

5. In a connector element according to claim 4, wherein there are at least two sub-grooves on each side, said sub grooves extending to the end face of the carrier member.

6. In a connector element for optical fibers, said connector element comprising two carrier members having end faces being arranged in alignment with the end faces abutting, each of the carrier members having an upper surface with a plurality of V-shaped centering grooves proceeding parallel to each other and containing said optical fibers, guide channels proceeding on both sides of the centering grooves for receiving guide rails which extend between the two carrier members, a cover plate lying on the optical fibers in the grooves of each member, an adhesive material for mutually fastening the optical fibers, cover plate and respective carrier member together, and an immersion fluid being introduced adjacent the abutting surfaces of the members, the improvements comprising means for preventing a flow of both excess adhesive material and immersion fluid into the guide channels, said means for preventing including collecting surfaces provided adjacent each side of the centering grooves, said collecting surfaces being formed by lateral edges of the cover plate said lateral edges being beveled to proceed outward toward the guide channels in a wedge-shaped fashion from the upper surface of the carrier member.

7. In a connector element according to claim 6, wherein the lateral edges form an acute angle with the upper surface of the carrier member.

8. In a connector element according to claim 7, wherein said acute angle lies in the range of 30°–45°.

9. In a connector element according to claim 7, wherein the acute angle is approximately 35°.

* * * * *